United States Patent [19]
Willems et al.

[11] Patent Number: 5,736,069
[45] Date of Patent: Apr. 7, 1998

[54] RADIATION IMAGE STORAGE SCREEN COMPRISING AND ALKALI METAL HALIDE PHOSPHOR

[75] Inventors: Peter Willems, Stekene; Paul Leblans, Kontich; Luc Struye, Mortsel, all of Belgium; Johann-Martin Spaeth; Thomas Hangleiter, both of Paderborn, Germany; Carsten Dietze, Borchen, Germany

[73] Assignee: Agfa-Gevaert, N.V., Mortsel, Belgium

[21] Appl. No.: 666,934

[22] Filed: Jun. 20, 1996

[30] Foreign Application Priority Data

Jun. 30, 1995 [EP] European Pat. Off. ............ 95201785

[51] Int. Cl.$^6$ .................................................. C09K 11/34
[52] U.S. Cl. .................... 252/301.4 H; 428/691; 250/484.2; 250/484.4; 250/363.01
[58] Field of Search .................. 252/301.41; 428/691; 250/484.2, 363.01, 484.4

[56] References Cited

U.S. PATENT DOCUMENTS 4,806,757  2/1989  Kano et al. ................. 252/301.4 H

FOREIGN PATENT DOCUMENTS 0522605  1/1993  European Pat. Off. .
2952436  7/1981  Germany .................... 252/301.4 H

OTHER PUBLICATIONS

Chemical Abstracts, vol. 114, No. 4, 28 Jan. 1991, Abstract No. 32220.

Chemical Abstracts, vol. 114, No. 4, 28 Jan. 1991, Abstract No. 32097.

Chemical Abstracts, vol. 111, No. 24, 11 Dec. 1989, Abstract No. 221382.

Chemical Abstracts, vol. 96, No. 24, 14 Jun. 1982, Abstract No. 207498.

*Primary Examiner*—Melissa Bonner
*Attorney, Agent, or Firm*—Breiner & Breiner

[57] ABSTRACT

A radiation image storage screen is provided comprising an alkali metal phosphor wherein the dopant is selected from the group consisting of $Ga^{1+}$, $Ge^{2+}$, $Sn^{2+}$, $Sb^{3+}$ and $As^{3+}$. In a preferred embodiment the alkali metal is Cs and/or Rb.

9 Claims, No Drawings

RADIATION IMAGE STORAGE SCREEN COMPRISING AND ALKALI METAL HALIDE PHOSPHOR

FIELD OF THE INVENTION

This invention relates to a class of compounds that under influence of the absorption of X-rays store a certain portion of the absorbed X-ray energy. This stored energy can be emitted later on as light. This invention relates also to a method of recording and reproducing an X-ray pattern by means of a screen or panel containing a compound of said class.

BACKGROUND OF THE INVENTION

A well known use of phosphors is in the production of X-ray images. In a conventional radiographic system an X-ray radiograph is obtained by X-rays transmitted image-wise through an object and converted into light of corresponding intensity in a so-called intensifying screen (X-ray conversion screen) wherein phosphor particles absorb the transmitted X-rays and convert them into visible light and/or ultraviolet radiation to which a photographic film is more sensitive than to the direct impact of X-rays.

According to another method of recording and reproducing an X-ray pattern disclosed e.g. in U.S. Pat. No. 3,859,527 a special type of phosphor is used, known as a photostimulable phosphor, which being incorporated in a panel is exposed to incident pattern-wise modulated X-rays and as a result thereof temporarily stores therein energy contained in the X-ray radiation pattern. At some interval after the exposure, a beam of visible or infra-red light scans the panel to stimulate the release of stored energy as light that is detected and converted to sequential electrical signals which are can be processed to produce a visible image. For this purpose, the phosphor should store as much as possible of the incident X-ray energy and emit as little as possible of the stored energy until stimulated by the scanning beam. This is called "digital radiography" or "computed radiography".

The image quality that is produced by a conventional as well as by a digital radiographic system, mainly depends on the construction of the phosphor screen. Generally, the thinner a phosphor screen at a given amount of absorption of X-rays, the better the image quality will be. This means that the lower the ratio of binder to phosphor of a phosphor screen, the better the image quality, attainable with that screen, will be. Optimum sharpness can thus be obtained when "single crystal" screens (i.e. screens without any binder) are used. Such screen can be produced, e.g., by vacuum deposition of phosphor material on a substrate. However, this production method can not be used to produce high quality screens with every arbitrary phosphor available. The mentioned production method leads to the best results when phosphor crystals with high crystal symmetry are used. Phosphor having complicated crystal structures as, e.g., alkaline earth fluorohalides, tend to decompose (partially) under vacuum deposition and the production of screens by vacuum deposition while using phosphors with complicated crystal structure is quasi impossible and leads to sub-optimal results.

The use of alkali metal halide phosphors in storage screens or panels is well known in the art of storage phosphor radiology, wherein at least part of the energy contained in an X-ray pattern is temporarily stored. The high crystal symmetry of these phosphors makes it possible to provide structured screens and binderless screens. Examples of such alkali metal phosphor can be found in several documents. In e.g. U.S. Pat. No. 5,028,509 a phosphor corresponding to general formula:

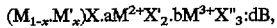

$$(M_{1-x}.M'_x)X.aM^{2+}X'_2.bM^{3+}X''_3:dB,$$

wherein M is Cs or Rb, M' is at least one metal selected from the group consisting of Li, Na, K, Rb, and Cs, $M^{2+}$ is at least one metal selected from the group consisting of Be, Mg, Ca, Sr, Ba, Zn, Cd, Cu and Ni, $M^{3+}$ is at least one metal selected from the group Sc, Y, La, Ce, Pr, Nd, Pm, Sm, Eu, Gd, Tb, Dy, Ho, Er, Tm, Yb, Lu, Al, Ga and In; X, X' and X" can be the same or different and each represents a halogen atom selected from the group consisting of F, Br, Cl, I with the proviso that all X' atoms are the same, B is an element selected from the group consisting of Eu, Tb, Ce, Tm, Dy, Pr, Ho, Nd, Yb, Er, Gd, Lu, Sm, Y, Tl, Na, Ag, Cu, Mg, Pb, Bi, Mn, and In.

$$0 \leq x \leq 1 \text{ and } 0 \leq a \leq 1 \text{ en } 0 \leq b \leq 0.5 \text{ and } 0 < d \leq 0.2.$$

In U.S. Pat. No. 5,055,681 a binderless screen comprising the phosphor as disclosed in U.S. Pat. No. 5,028,509 has been disclosed.

In Japanese Laid Open Application 62/209187 an screen comprising a phosphor with general formula:

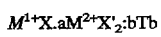

$$M^{1+}X.aM^{2+}X'_2:bTb$$

is disclosed. Herein, $M^{1+}$ is at least one metal selected from the group consisting of Na, K, Rb and Cs, $M^{2+}$ at least one metal selected from the group Be, Mg, Ca, Ba, Si, Zn, Cu and Ni, X and X' can be the same and are at least one selected from the group F, Cl, Br and I.

$$0 < a \leq 4, \ 0 < b \leq 0.2$$

In U.S. Pat. No. 4,806,757 a CsI phosphor is disclosed, comprising between 0.0001 to 1 mole % of at least one element selected from the group consisting of Li, K, Rb, Cu, Au, Be, Mg, Ca, Sr, Ba, Zn, Cd, Hg, B, Al, Ga, In, Tl, Sc, Y, La, Ce, Pr, Nd, Sm, Eu, Gd, Tb, Dy, Ho, Er, Tm, Yb, Lu, Si, Ti, Zr, Ge, Sn, Pb, As, Sb and Bi.

Although several studies on alkali metal halide phosphors have been performed, up until now, the qualities (e.g. absorption characteristics, speed, storage capabilities etc) have not yet met the expectations.

OBJECT AND SUMMARY OF THE INVENTION

It is an object of the invention to provide new alkali metal halide phosphors useful computed radiography, using storage phosphor screens.

It is another object of the invention to provide alkali metal halide storage phosphors that combine high speed with high chemical stability and low sensitivity to humidity.

It is still an other object of the invention to provide phosphors that make it easier to produce screens comprising vapour deposited phosphor layers.

It is still a further object of the invention to provide a method for recording X-rays comprising the steps of (i) exposing a photostimulable storage phosphor screen, comprising novel alkali metal halide phosphors, (ii) stimulating said photostimulable screen to release the stored X-ray energy as stimulated light and (iii) collecting said stimulated light.

Further objects and advantages of the present invention will become clear from the description hereinafter.

The objects of this invention are realised by providing a radiation image storage phosphor screen comprising an alkali metal halide phosphor characterized in that said phosphor contains a dopant selected from the group consisting of $Ga^{1+}$, $Ge^{2+}$, $Sn^{2+}$, $Sb^{3+}$ and $As^{3+}$.

DETAILED DESCRIPTION OF THE INVENTION

In this document the term "X-ray" has to be understood as any penetrating radiation and includes i.a. radiation originating from a radioisotope (e.g. a Co60 source), radiation created by an X-ray generator of any type, radiation and high energy particles created by a high energy radiation generator (e.g. Betatron), radiation from a sample labeled with a radioisotope as is the case in e.g. autoradiography.

It was known that alkali metal halide phosphors doped with e.g. Tl or In were good storage phosphors. It was surprisingly found that the performance of such phosphors could greatly be enhanced when the dopant was not Tl or In but was selected from the group consisting of $Ga^{1+}$, $Ge^{2+}$, $Sn^{2+}$, $Sb^{3+}$ and $As^{3+}$.

A phosphor according to the present invention corresponds to the general formula I:

$$M^{1+}X.aM^{2+}X'_2.bM^{3+}X''_3:cZ \qquad I$$

wherein:
$M^{1+}$ is at least one member selected from the group consisting of Li, Na, K, Cs and Rb,
$M^{2+}$ is a least one member selected from the group consisting of Be, Mg, Ca, Sr, Ba, Zn, Cd, Cu, Pb and Ni,
$M^{3+}$ is a least one member selected from the group consisting of Sc, Y, La, Ce, Pr, Nd, Pm, Sm, Eu, Gd, Tb, Dy, Ho, Er, Tm, Yb, Lu, Al, Bi, In and Ga,
Z is at least one member selected from the group $Ga^{1+}$, $Ge^{2+}$, $Sn^{2+}$, $Sb^{3+}$ and $As^{3+}$,
X, X' and X" can be the same or different and each represents a halogen atom selected from the group consisting of F, Br, Cl, I and $0 \leq a < 1$, $0 \leq b \leq 1$ and $0 < c \leq 0.2$.

In a preferred embodiment of the invention, $M^{1+}$ stands for Cs and/or Rb.

In a preferred embodiment b=0 and $M^{2+}$ is at least one member selected from the group consisting of Pb and Cd. In an other preferred embodiment, b=0, and $M^{3+}$ is Bi.

In a further preferred embodiment of the invention a=b=0.

In still a further preferred embodiment, $Z=Ga^{1+}$.

Preferred phosphors, where b=0 are e.g. $CsPbBr_3:cGa^{1+}$, $CsCdBr_3:cGa^{1+}$, $RbPbBr_3:cGa^{1+}$, $RbCdBr_3:cGa^{1+}$. A preferred phosphor where a=0 is e.g. $Cs_3Bi_2Br_9:cGa^{1+}$. Very useful and highly preferred phosphors according to the present invention are phosphors where a=b=0 and $Z=Ga^{1+}$.

The alkali metal phosphors according to the present invention can be produced according to any way known in the art, starting from phosphor precursors, e.g. oxides, carbonates, sulfonates, halides, phosphates, nitrates, oxalates, lactates, acetylacetonates, malonates, phthalates, alkoxides, phenoxides or ethylenediamine derivatives of the metalions that are to be incorporated in the phosphor. These phosphor precursors are mixed in the appropriate stoechiometric proportions and are then heated for a given time. After cooling, the sintered block of phosphor is milled into fine phosphor particles. The milling operation continues until phosphor particles with the appropriate average particle size and size distribution are obtained. During the preparation of the phosphor any known flux materials can be added to the reaction mixture. Flux materials useful for use in the preparation of the phosphors according to the invention are, e.g., halides, metasilicates of alkali metals or alkaline earth metals. A very useful and preferred method for the preparation of alkali metal phosphors according to the present invention can be found in Research Disclosure Volume 358, Februari 1994 p 93 item 35841, that is incorporated herein by reference.

An other useful method for preparation of alkali metal phosphors according to this invention can be found in U.S. Pat. No. 5,154,360.

The average grain size of said alkali metal-phosphors is preferably in the range of 2 to 25 μm, more preferably in the range of 3 to 15 μm.

The alkali metal phosphors according to this invention can beneficially be used to form a radiation image storage screen or panel. A storage panel or screen comprising a phosphor according to the present invention can be used in a method for recording and reproducing penetrating radiation images comprising the steps of i. exposing a photostimulable storage phosphor screen,
ii stimulating said photostimulable screen to release the stored X-ray energy as stimulated light and
iii collecting said stimulated light.

The screens or panels are in step ii preferably stimulated by a laser emitting light between 500 and 1000 nm. Very useful laser are Ar gas ion laser (514 nm), frequency double NdYAG laser (532 nm), He—Ne laser (632 nm), diode lasers emitting at 680 nm, a GaAs laser emitting at 835 nm etc.

It is possible to use the alkali metal phosphors according to the present invention either alone or mixed with one or more other phosphors. Mixtures of alkali metal phosphors and other storage phosphors can be useful to fine-tune the quality of the screen (e.g. sharpness, noise, speed, etc).

The storage screen or panels according to the present invention can be prepared by vacuum deposition of a phosphor according to the present invention on a support, yielding a panel or screen having substantially no binder present. It is also possible to prepare panels by electro-depositing the phosphor on to the support also yielding a screen or panel comprising substantially no binder. A very suitable method for electro-depositing phosphors according to the present invention has been disclosed in U.S. Pat. No. 5,296,117, that is incorporated herein by reference.

The storage screen or panel can be either self supporting or can comprises a mixture of the alkali metal-phosphor and a binder, coated on a support.

Any binder known in the art can be used to form a screen or panel comprising an alkali metal-phosphor according to the present invention. Suitable binders are, e.g., gelatin, polysaccharides such as dextran, gum arabic, and synthetic polymers such as polyvinyl butyral, polyvinyl acetate, nitrocellulose, ethylcellulose, vinylidene chloride-vinyl chloride copolymer, polyalkyl (meth)acrylate, vinyl chloride-vinyl acetate copolymer, polyurethane, cellulose acetate, cellulose acetate butyrate, polyvinyl alcohol, polystyrene, polyester, etc. These and other useful binders are disclosed e.g. in U.S. Pat. No. 2,502,529, U.S. Pat. No. 2,887,379, U.S. Pat. No. 3,617,285, U.S. Pat. No. 3,300,310, U.S. Pat. No. 3,300,311 and U.S. Pat. No. 3,743,833.

A mixture of two or more of these binders may be used, e.g., a mixture of polyethyl acrylate and cellulose acetobutyrate.

The weight ratio of phosphor to binder is generally within the range of from 50:50 to 99:1, preferably from 80:20 to 99:1. Preferably a self-supporting or supported layer of alkali metal-phosphor particles according to the present invention comprises said particles dispersed in a binding medium and a protective coating thereover characterised in that the binding medium substantially consists of one or more hydrogenated styrene-diene block copolymers, having a saturated rubber block, as rubbery and/or elastomeric polymers. The polymer can be represented by the formula A-B-A (tri-block) or by the formula A-B (di-block), wherein A represents styrene and B represents the hydrogenated diene block e.g. ethylene-butylene or ethylene-propylene.

Further the ratio by volume of phoshor to binding medium is referably more than 70/30 and still more preferably more than 85/15.

The coating weight of alkali metal-phosphor particles can be adapted to the desired speed of the storage screen or panel, but preferably a coating weight between 5 and 250 mg/cm$^2$, most preferably between 20 and 175 mg/cm$^2$, is used.

By said hydrogenated diene copolymers, for use as rubbery and/or elastomeric polymers, the phosphor layer has improved elasticity of the screen, high protection against mechanical damage and thus high ease of manipulation and allow high pigment to binder ratio without getting deteriorated by ageing after frequent reuse.

Particularly suitable thermoplastic rubbers, used as block-copolymeric binders in phosphor screens in accordance with this invention are the KRATON-G rubbers, KRATON being a trade mark name from SHELL. KRATON-G thermoplastic rubber polymers are a unique class of rubbers designed for use without vulcanisation. In the published report KR.G.2.1 (INTERACT/7641/2m/1186 GP KRA/ENG) wherein a description of KRATON-G rubbers is given, the KRATON-G 1600 series rubbers are presented as block copolymers in which the elastomeric midblock of the molecule is a saturated olefin rubber. KRATON-G 1600 series rubbers are described to possess excellent resistance to degradation by oxygen, ozone and UV light and they also have high cohesive strength and retain their structural integrity at elevated temperatures.

A storage screen or panel comprising alkali metals according to the present invention can be prepared by the following manufacturing process.

The phosphor layer can be applied to the support by any coating procedure, making use of solvents for the binder of the phosphor containing layer as well as of useful dispersing agents, useful plasticizers, useful fillers and subbing or interlayer layer compositions that have been described in extenso in EP-A 0 510 753.

Alkali metal-phosphor particles, according to the present invention, are mixed with the dissolved rubbery polymer, in a suitable mixing ratio to prepare a dispersion. Said dispersion is uniformly applied to a substrate by a known coating technique, e.g. doctor blade coating, roll coating, gravure coating or wire bar coating, and dried to form a phosphor layer.

In the preparation of a storage screen, one or more additional layers are occasionally provided between the support and the phosphor containing layer, having subbing- or interlayer compositions, so as to improve the bonding between the support and the phosphor layer, or to improve the sensitivity of the screen or the sharpness and resolution of an image provided thereby. For instance, a subbing layer or an adhesive layer may be provided by coating polymer material, e.g., gelatin, a polyester cross-linked by a reaction with a tri-isocyanate or a polyester with only terminal hydroxyl groups, the chain length of which has been increased by the reaction of said terminal hydroxyl groups and a di-isocyanate, over the surface of the support on the phosphor layer side. Said subbing layer may contain also modified thermoplastic acrylic resins such as those described above to improve the adhesion properties of the subbing layers. A light-reflecting layer may be provided, e.g. by vacuum-depositing an aluminium layer or by coating a pigment-binder layer wherein the pigment is e.g. titanium dioxide. For the manufacture of light-absorbing layer, serving as anti-halation layer, carbon black dispersed in a binder may be used but also any known anti-halation dye. Such additional layer(s) may be coated on the support either as a backing layer or interposed between the support and the phosphor containing layer(s). Several of said additional layers may be applied in combination.

After applying the coating dispersion onto the support, the coating dispersion is heated slowly to dryness so as to complete the formation of a phosphor layer. In order to remove as much as possible entrapped air in the phosphor coating composition it can be subjected to an ultra-sonic treatment before coating. Another method to reduce the amount of entrapped air consists in a compression method as has been described in EP-A 393 662 wherein the said compression is preferably carried out at a temperature not lower than the softening point or melting point of the rubbery binder to improve the phosphor packing density in the dried layer.

In order to avoid electrostatic discharges during manufacture of the screen, especially during the coating procedure, conductive compounds can be added to the phosphor/binder mixture or the support can be provided with a conductive layer (lateral resistance<$10^{12}$ Ω/square) on that side of the support opposite to the side to be coated with the phosphor/binder mixture.

If necessary, after coating the phosphor/binder mixture the conductive layer on the side of the support opposite to the phosphor/binder mixture layer, may be covered by a plastic sheet or web material.

After the formation of the phosphor layer, a protective layer is generally provided on top of the phosphor layer. The protective coating composition can be applied as described e.g. in U.S. Pat. No. 4,059,768.

In a preferred embodiment the protective coating composition is applied by a rotary screen printing device as has been described in detail in EP-A 510 753. The top coat is preferably formed by applying a radiation curable coating on top of the phosphor layer.

When the radiation-curing is carried out with ultraviolet radiation (UV), a photoinitiator is present in the coating composition to serve as a catalyst to initiate the polymerization of the monomers and their optional cross-linking with the pre-polymers resulting in curing of the coated protective layer composition.

To the radiation-curable coating composition there may be added a storage stabilizer, a colorant, and other additives, and then dissolved or dispersed therein to prepare the coating liquid for the protective layer. Examples of colorants that can be used in the protective layer include MAKROLEX ROT EG, MAKROLEX ROT GS and MAKROLEX ROT E2G. MAKROLEX is a registered tradename of Bayer AG, Leverkusen, Germany.

A variety of other optional compounds can be included in the radiation-curable coating composition of the present storage article such as compounds to reduce static electrical charge accumulation, plasticizers, matting agents, lubricants, de-foamers and the like as has been described in the EP-A 510 753. In said document a description has also been given of the apparatus and methods for curing, as well as a non-limitative survey of X-ray conversion screen phosphors, of photostimulable phosphors and of binders of the phosphor containing layer.

The cured protective layer can also comprise phosphor particles. In doing so the speed/sharpness relation and the SNR (signal to noise ratio) of the screen can be improved.

The edges of the screen, being especially vulnerable by multiple manipulation, may be reinforced by covering the edges (side surfaces) with a polymer material being formed essentially from a moisture-hardened polymer composition prepared according to EP-Application No. 541 146.

An other very useful way to reinforce of the edges of a screen or panel, also those comprising alkali metal phosphors according to the present invention, is to coat the edges with a polymeric composition comprising polyvinylacetate, crotonic acid and isocyanates. Preferably a copolymer of vinylacetate and crotonic acid (e.g. MOWILITH CT5, a trade name of Hoechts AG, Frankfurt, Germany) is used in combination with isocyanates.

Support materials for storage screens in accordance with the present invention include cardboard, plastic films such as films of cellulose acetate, polyvinyl chloride, polyvinyl acetate, polyacrylonitrile, polystyrene, polyester, polyethylene terephthalate, polyamide, polyimide, cellulose triacetate and polycarbonate; metal sheets such as aluminum foil and aluminum alloy foil; ordinary papers; baryta paper; resin-coated papers; pigment papers containing titanium dioxide or the like; and papers sized with polyvinyl alcohol or the like. A plastic film is preferably employed as the support material.

The plastic film may contain a light-absorbing material such as carbon black, or may contain a light-reflecting material such as titanium dioxide or barium sulfate. The former is appropriate for preparing a high-resolution type storage screen, while the latter is appropriate for preparing a high-sensitivity type storage screen.

Examples of preferred supports include polyethylene terephthalate, clear or blue coloured or black coloured (e.g., LUMIRROR C, type X30, (trade name) supplied by Toray Industries, Tokyo, Japan), polyethylene terephthalate filled with $TiO_2$ or with $BaSO_4$. Metals as e.g. aluminum, bismuth and the like may be deposited e.g. by vaporization techniques to get a polyester support having radiation-reflective properties.

These supports may have thicknesses which may differ depending on the material of the support, and may generally be between 60 and 1000 µm, more preferably between 80 and 500 µm from the standpoint of handling.

A screen or panel comprising an alkali metal-phosphor according to the present invention can carry an antistatic layer either on top of a protective layer or on the side of the support opposite to the side carrying said alkali metal-phosphor. Said antistatic layer may comprises inorganic antistatic agents, e.g. metaloxides as disclosed in, e.g., EP-A 0 579 016 as well as organic antistatic agents (polyethylene oxides, poly(ethylenedioxythiophene) as disclosed in, e.g., EP-A 0 440 957.

EXAMPLES

Measurements of the Properties of the Phosphors

The determination of the properties of panels or screens comprising an alkali metal-phosphor according to the present invention proceeded through following measurements:

In the first measurement the total photostimulable energy stored upon exposure to a given X-ray dose was determined. This property is expressed as "conversion efficiency" (C.E.).

Prior to X-ray excitation any residual energy still present in the phosphor screen was removed by irradiation with light of a 500 W quartz-halogen lamp. The phosphor screen was then excited with an X-ray source operating at 80 kVp and 5 mA. For that purpose the BALTEAUGRAPHE 2000 (tradename) X-ray source of Balteau, France was used. The low energy X-rays are filtered out with a 21 mm thick aluminium plate to harden the X-ray spectrum. After X-ray excitation the phosphor screen was transferred in the dark to the measurement set-up. In this setup laser light was used to photostimulate the X-ray irradiated phosphor screen. The laser used in this measurement was a diode laser emitting at 680 nm with a power of 20 mW. The diode laser was the type TOLD 9150, trade name of Toshiba, Japan.

The laser-optics comprise an electronic shutter, a beam-expander and a filter. A photomultiplier (Hamamatsu R 376) collects the light emitted by the photostimulation and gives a corresponding electrical current. The measurement procedure was controlled by a Hewlett Packard HP 382 (tradename) computer connected to a HP 6944 (tradename) multiprogrammer. After amplification with a current to voltage converter a TEKTRONIX TDS 420 (tradename) digital oscilloscope visualizes the photocurrent obtained. When the electronic shutter was opened the laser beam begins to stimulate the phosphor screen and the digital oscilloscope was triggered. Using a diaphragm placed in contact with the screen the light emitted by only 7 $mm^2$ was collected. Approximately half of the laser power (6 mW) reaches the screen surface. In this way the intensity of the stimulating beam was more uniform.

The stimulating laser light (reflecting from the screen) and the stimulated emission light are separated by a filter combination of 5 mm HOYA B40 (trade name) filter and 1 mm BG 39 SCHOTT (trade name) filter, so that only the emitted light reaches the photomultiplier.

The signal amplitude from the photomultiplier is linear with the intensity of the photostimulating light and with the stored photostimulable energy. The signal decreases with time. When the signal curve was entered the oscilloscope was triggered a second time to measure the offset which was defined as the component of error that was constant and independent of inputs. After subtracting this offset the point at which the signal reaches 1/e of the maximum value was calculated. The integral below the curve was then calculated from the start to this 1/e point. The function was described mathematically by $f(t)=A.e^{-t/\tau}$; wherein A is the amplitude, $\tau$ is the time constant, t is stimulation time, and e is the base number of natural logarithms.

The 1/e point is reached when $t=\tau$ at which 63% of the stored energy has been released. To obtain said result, the computer multiplies the integral with the sensitivity of the system. The sensitivity of the photomultiplier and amplifier have therefore to be measured as a function of anode-cathode voltage of the photomultiplier and the convolution of the emission spectrum of the phosphor, the transmission spectrum of the separating filter (5 mm HOYA B40 (trade name) filter and 1 mm BG 39 SCHOTT (trade name)) and the wavelength dependence of the response of the photomultiplier have to be calculated. Because the emission light is scattered in all directions only a fraction of the emitted light is detected by the photomultiplier. The position of the panel and photomultiplier are such that 10% of the total emission was detected by the photomultiplier. After all these corrections have been made a conversion efficiency value (C.E.) was obtained in $pJ/mm^2/mR$. This value varies with screen thickness and therefore for measurements to be comparable they have to be carried out at constant phosphor coverage. The stimulation energy (SE) was defined as the energy necessary to stimulate 63% of the stored energy and was expressed in $\mu J/mm^2$. This value is obtained by multiplying the time to reach the 1/e emission intensity value by the stimulating intensity.

In a second measurement the stimulation spectrum was determined. The light of a tungsten (quartz-iodine) lamp was fed into a monochromator (SPEX 270M trade name of Yvon-Jobin, France) and then mechanically chopped with a rotating wheel with a single slit. The lamp provides a continuous spectrum extending from the near UV through the visible spectrum into the infrared. The 520.24.33.0 grating from Yvon-Jobin was a 1200 line/mm grating covering the visible range from 350 nm to 1100 nm in the first order and was blazed at 750 nm. The wavelength of the stimulating light can be set via a step motor connected to the monochromator under the control of a computer. The second harmonic of the monochromator was eliminated by placing a 4 mm Schott GG435 filter in front of the phosphor screen, when the monochromator is set at a wavelength longer than 800 nm a RG 665 SCHOTT filter (tradename) was added. By chopping the stimulating light (duty cycle 1/200) only a small fraction of the absorbed energy in the phosphor was released. Only the AC signal was measured to eliminate the offset caused due to e.g. the dark current of the photomultiplier. A good signal to noise ratio was obtained by averaging several pulses. Upon completing the measurement the computer corrects the curve for the intensity wavelength dependence of the tungsten lamp and the diffraction efficiency of the grating The present invention is illustrated by the following example. The example is not limiting in any way.

Example

The Preparation of the Phosphors

Invention Phosphor 1 (IP1)

A single crystal of $CsBr:Ga^{1+}$ was prepared. 99.999% pure CsBr, and a 1:2 mixture by weight of metallic Gallium and $GaCl_3$ were dried under vacuum and purified by zone refining. After drying and purifying the components were mixed so as to incorporate 0.10 mole % of $Ga^{1+}$ in the phosphor. This mixture was placed in a carbon crucible and high frequency dried under vacuum at 400° C. for 16 hours. The single crystal was then grown at 925° C. with a pulling rate of 2 mm/hour. The effective concentration of the dopant $Ga^{1+}$ was measured and was 100 ppm.

The obtained single crystal of the phosphor was crushed to obtain a powdered sample of the phosphor.

Invention Phosphor 2 (IP2)

A single crystal of $RbBr:Ga^{1+}$ was prepared. 99.999% pure CsBr, and a 1:2 mixture by weight of metallic Gallium and $GaCl_3$ were dried under vacuum and purified by zone refining. After drying and purifying the components were mixed so as to incorporate 0.10 mole % of $Ga^{1+}$ in the phosphor. This mixture was placed in a carbon crucible and high frequency dried under vacuum at 400° C. for 16 hours. The single crystal was then grown at 925° C. with a pulling rate of 2 mm/hour. The effective concentration of the dopant $Ga^{1+}$ was measured and was 100 ppm.

The obtained single crystal of the phosphor was crushed to obtain a powdered sample of the phosphor.

Non-Invention Phosphor 1 (NIP1)

A single crystal of $CsBr:In^{1+}$ was prepared. 99.999% pure CsBr, and $InCl_3$ were dried under vacuum and purified by zone refining. After drying and purifying the components were mixed so as to incorporate 0.10 mole % of $In^{1+}$ in the phosphor. This mixture was placed in a carbon crucible and high frequency dried under vacuum at 400° C. for 16 hours. The single crystal was then grown at 925° C. with a pulling rate of 2 mm/hour. The effective concentration of the dopant $In^{1+}$ was measured and was 100 ppm.

The obtained single crystal of the phosphor was crushed to obtain a powdered sample of the phosphor.

Non-Invention Phosphor 2 (NIP2)

A single crystal of $RbBr:In^{1+}$ was prepared. 99.999% pure CsBr, and $InCl_3$ were dried under vacuum and purified by zone refining. After drying and purifying the components were mixed so as to incorporate 0.10 mole % of $In^{1+}$ in the phosphor. This mixture was placed in a carbon crucible and high frequency dried under vacuum at 400° C. for 16 hours. The single crystal was then grown at 925° C. with a pulling rate of 2 mm/hour. The effective concentration of the dopant $In^{1+}$ was measured and was 100 ppm.

The obtained single crystal of the phosphor was crushed to obtain a powdered sample of the phosphor.

Manufacture of the Screens

The powder samples of IP1, IP2, NIP1 and NIP2 were dispersed in a binder solution containing polyethylacrylate dissolved in ethyl acetate. The dispersion obtained was coated onto a 100 μm thick transparent sheet of polyethylene terephthalate to give a coating weight of 1000 g/m2, with a phosphor to binder ratio (by weight) of 97/3.

The screens were used to determine the energy storage characteristics of the phosphors. For this purpose a diode laser emitting at wavelength 680 nm with a mW power was used. After erasing any residual stored energy by exposure to a quartz-halogen lamp, the screen was irradiated with a given dose of X-rays and then stimulated with the diode laser as described hereinbefore.

The conversion efficiency (C.E.) determined as described hereinbefore and expressed in $pJ/mm^2/mR$ and stimulation energy (SE) in $\mu J/mm^2$ needed to stimulate the screens are reported in table 1. From these values a figure of merit (FOM) is calculated over (C.E./SE)×1000. The figure of merit (FOM) for the $In^{1+}$ doped phosphors is arbitrary set to 100. This figure is also reported in table 1.

TABLE 1

| Phosphor N° | Formula | C.E. pJ/mm²/mR | SE μJ/mm² | FOM* |
|---|---|---|---|---|
| IP1 | $CsBr:Ga^{1+}$ | 5.4 | 4.3 | 979 |
| NIP1 | $CsBr:In^{1+}$ | 3.0 | 23.0 | 100 |
| IP2 | $RbBr:Ga^{1+}$ | 5.6 | 3.9 | 1900 |
| NIP2 | $RbBr:In^{1+}$ | 1.9 | 25.0 | 100 |

*relative FIGS., the FOM of In-doped phosphors was arbitrarily set to 100.

We claim:

1. A radiation image storage screen comprising an alkali metal halide phosphor corresponding to formula I:

$$M^{1+}X.aM^{2+}X'_2.bM^{3+}X''_3:cZ \qquad I$$

wherein:

$M^{1+}$ is at least one member selected from the group consisting of Li, Na, K, Cs and Rb, $M^{2+}$ is at least one member selected from the group consisting of Be, Mg, Ca, Sr, Ba, Zn, Cd, Cu, Pb and Ni, $M^{3+}$ is at least one member selected from the group consisting of Sc, Y, La, Ce, Pr, Nd, Pm, Sm, Eu, Gd, Tb, Dy, Ho, Er, Tm, Yb, Lu, Al, Bi, In and Ga, Z is at least one member selected from the group $Ga^{1+}$, $Ge^{2+}$, $Sn^{2+}$, $Sb^{3+}$ and $As^{3+}$, X, X' and X" can be the same or different and each represents a halogen atom selected from the group consisting of F, Br, and Cl, and $0 \leq a \leq 1$, $0 \leq b \leq 1$ and $0 < c \leq c0.2$.

2. A radiation image storage screen according to claim 1, wherein $M^{1+}$ is at least one member selected from the group consisting of Cs and Rb.

3. A radiation image storage screen according to claim 1, wherein b=0 and $M^{2+}$ is at least one member selected from the group consisting of Pb and Cd.

4. A radiation image storage screen according to claim 1, wherein a=0, and $M^{3+}$ is Bi.

5. A radiation image storage screen according to claim 1, wherein a=b=0.

6. A radiation image storage screen, according to claim 5, wherein X is Br, $M^{1+}$ is a member selected from the group consisting of Cs and Rb, Z is $Ga^{1+}$ and $0<c\leq0.2$.

7. A radiation image storage screen according to claim 1, wherein $Z=Ga^{1+}$.

8. A radiation image storage screen according to claim 1, wherein said alkali metal phosphor is a member selected from the group consisting of $CsPbBr_3:cGa^{1+}$, $CsCdBr_3:cGa^{1+}$, $RbPbBr_3:cGa^{1+}$, $RbCdBr_3:cGa^{1+}$, and $Cs_3Bi_2Br_9:cGa^{1+}$, wherein $0<c\leq0.2$.

9. A method for recording and reproducing penetrating radiation images comprising the steps of i. exposing a photostimulable storage phosphor screen to X-rays, ii. stimulating said photostimulable phosphor screen to release the stored X-ray energy as stimulated light and iii. collecting said stimulated light, wherein said photostimulable phosphor screen comprises an alkali metal halide phosphor corresponding to formula I:

$$M^{1+}X.aM^{2+}X'_2.bM^{3+}X''_3:cZ \qquad I$$

wherein:

$M^{1+}$ is at least one member selected from the group consisting of Li, Na, K, Cs and Rb, $M^{2+}$ is at least one member selected from the group consisting of Be, Mg, Ca, Sr, Ba, Zn, Cd, Cu, Pb and Ni, $M^{3+}$ is at least one member selected from the group consisting of Sc, Y, La, Ce, Pr, Nd, Pm, Sm, Eu, Gd, Tb, Dy, Ho, Er, Tm, Yb, Lu, Al, Bi, In and Ga, Z is at least one member selected from the group $Ga^{1+}$, $Ge^{2+}$, $Sn^{2+}$, $Sb^{3+}$ and $As^{3+}$, X, X' and X" can be the same or different and each represents a halogen atom selected from the group consisting of F, Br, and Cl and $0<a\leq1$, $0\leq b\leq1$ and $0<c\leq0.2$.

* * * * *

UNITED STATES PATENT AND TRADEMARK OFFICE
CERTIFICATE OF CORRECTION

PATENT NO. : 5,736,069
DATED : April 7, 1998
INVENTOR(S) : Peter Willems et al

It is certified that error appears in the above-indentified patent and that said Letters Patent is hereby corrected as shown below:

On the title page and Column 1, line 3,

Title of invention should read:
 [54] RADIATION IMAGE STORAGE SCREEN COMPRISING AN ALKALI
     METAL HALIDE PHOSPHOR Column 1, lines 1-3, the title of invention is stated incorrectly; see above.

Column 2, line 18, "$0 \leq x \leq 1$ and $0 \leq \alpha \leq 1$ en $0 \leq b \leq 0.5$ and $0 < d \leq 0.2$" should read -- $0 \leq x \leq 1$ and $0 \leq \alpha \leq 1$ and $0 \leq b \leq 0.5$ and $0 < d \leq 0.2$ --, Claim 1, column 11, line 6, "$0 < c \leq c0.2.$" should read -- $0 < c \leq 0.2.$ --.

Signed and Sealed this

Eighteenth Day of August, 1998

Attest:

BRUCE LEHMAN

*Attesting Officer*   *Commissioner of Patents and Trademarks*